United States Patent
Zeng et al.

(10) Patent No.: US 9,745,398 B2
(45) Date of Patent: Aug. 29, 2017

(54) METHOD OF PREPARING FLUOROELASTOMER CAPABLE OF BEING VULCANIZED BY USING PEROXIDE

(71) Applicant: Zhonghao Chenguang Research Institute of Chemical Industry Company Limited, Zigong, SC (US)

(72) Inventors: Bo Zeng, Zigong (CN); Jianxin Zhang, Zigong (CN); Bin Li, Zigong (CN); Jun Lan, Zigong (CN); Jiayong Gao, Zigong (CN); Jing Bai, Zigong (CN)

(73) Assignee: ZHONGHAO CHENGUANG RESEARCH INSTITUTE OF CHEMICAL INDUSTRY COMPANY LIMITED (CN)

( * ) Notice: Subject to any disclaimer, the term of this patent is extended or adjusted under 35 U.S.C. 154(b) by 87 days.

(21) Appl. No.: 14/761,822

(22) PCT Filed: Nov. 25, 2013

(86) PCT No.: PCT/CN2013/087760
§ 371 (c)(1),
(2) Date: Jul. 17, 2015

(87) PCT Pub. No.: WO2015/003451
PCT Pub. Date: Jan. 15, 2015

(65) Prior Publication Data
US 2015/0344604 A1 Dec. 3, 2015

(30) Foreign Application Priority Data
Jul. 12, 2013 (CN) .......................... 2013 1 0293100

(51) Int. Cl.
| | | |
|---|---|---|
| C08F 214/18 | (2006.01) |
| C08F 214/22 | (2006.01) |
| C08F 2/24 | (2006.01) |
| C08F 2/38 | (2006.01) |
| C08F 214/28 | (2006.01) |

(52) U.S. Cl.
CPC .............. C08F 214/22 (2013.01); C08F 2/24 (2013.01); C08F 2/38 (2013.01); C08F 214/28 (2013.01)

(58) Field of Classification Search
USPC ......................... 526/225, 227, 255
See application file for complete search history.

(56) References Cited

U.S. PATENT DOCUMENTS

| | | | | |
|---|---|---|---|---|
| 4,243,770 A | * | 1/1981 | Tatemoto ................. | C08F 8/18 525/326.3 |
| 5,852,125 A | * | 12/1998 | Kruger .................... | C08F 14/22 525/326.2 |
| 2011/0015342 A1 | * | 1/2011 | Kose ...................... | C08F 214/18 524/758 |
| 2014/0357821 A1 | * | 12/2014 | Zhao ..................... | C08F 214/22 526/216 |

FOREIGN PATENT DOCUMENTS

| | | |
|---|---|---|
| CN | 101824119 A | 9/2010 |
| CN | 101981067 A | 2/2011 |
| CN | 102516438 A | 6/2012 |
| CN | 102558719 A | 7/2012 |
| CN | 102786700 A | 11/2012 |
| CN | 103342772 A | 10/2013 |
| JP | S60221409 | 11/1985 |

OTHER PUBLICATIONS

International Search Report; Mailed Apr. 3, 2014 for PCT Application No. PCT/CN2013/087760.

* cited by examiner

Primary Examiner — Mark Kaucher
Assistant Examiner — Henry Hu
(74) Attorney, Agent, or Firm — Mendelsohn Dunleavy, P.C.

(57) ABSTRACT

A method of preparing a fluoroelastomer capable of being vulcanized by using peroxide, the method comprising: in the presence of an initiator and a chain transfer agent, conducting emulsion polymerization reaction on comonomers to obtain a fluoroelastomer. The preparation method utilizes alkyl iodide $RI_x$ as the chain transfer agent, and introduces the atom I into the molecular structure of the polymer during the reaction, the atom I acting as a crosslinking point during peroxide vulcanization. The fluoroelastomer obtained via the preparation method greatly improves the performance after being vulcanized; in addition, due to the low cost and extensive sources of alkyl iodide, the preparation method also simplifies the manufacturing process, reduces cost, and has wide application prospects.

20 Claims, No Drawings

METHOD OF PREPARING FLUOROELASTOMER CAPABLE OF BEING VULCANIZED BY USING PEROXIDE

TECHNICAL FIELD

The present invention relates to a fluoroelastomer field, specifically relates to a method of preparing fluoroelastomer capable of being vulcanized by using peroxide.

BACKGROUND ART

Fluoroelastomer has been widely used in sealing materials, containers and hosepipes for its excellent heat resistance, oil resistance and chemical resistance. Common fluoroelastomer capable of being vulcanized by using peroxide mainly comprises two broad categories: vinylidene fluoride-based copolymerized elastomers and tetrafluoroethylene-based copolymerized elastomers, such as copolymerized elastomers of vinylidene fluoride (VDF), perfluoropropylene (HFP), tetrafluoroethylene (TFE) and bromine-containing alkenes. The polymerization mode of fluoroelastomers mainly comprises two categories: emulsion polymerization and suspension polymerization. For emulsion polymerization, the polymerization is initiated mainly using a water soluble initiator (persulfates), and after the polymerization, the ion terminal group may be easily produced. For suspension polymerization, the reaction is initiated using an oil soluble initiator, and the resulted elastomer neither has terminal ion nor has emulsifier residue, but the obtained polymer has relatively small molecular weight.

In order to obtain necessary physical performances widely required, the fluoroelastomer must be crosslinked before use. Its vulcanization system is a mixture of organic peroxides and multifunctional unsaturated active auxiliary, while its crosslinking site is "I" or "Br" atom of "C—I" or "C—Br" bond on the fluoroelastomer.

As reported in domestic and overseas patents and literatures, the vulcanization point monomers mainly used for peroxide vulcanized fluororubber mainly are bromine-containing alkenes, iodine-containing alkenes, non-conjugated dienes, cyano-containing alkenes, etc., and bromine atom, iodine atom, "C=C" double bond or —CN, which are introduced onto the molecular chain of fluoroelastomer during polymerization, act as a crosslinking point during peroxide vulcanization. Patent CN1665852A discloses a peroxide curable fluoroelastomer. The fluoroelastomer adopts $CH_2=CH-(CF_2)_nI$ (n=2-8), of which the representative substance is 4-iodo-3,3,4,4-tetrafluorobutene-1, as vulcanization point monomer, and uses RIx (R is perfluoroalkyl group having 3-10 carbon atoms, X=1-2) as chain transfer agent. "I" atom, which acts as a vulcanization point during vulcanization, is introduced into the middle and end of the molecular chain of the fluoroelastomer respectively. Thus, the existing preparation for fluoroelastomer capable of being vulcanized by using peroxide requires the use of bromine or iodine containing alkenes, and has complex preparation process and high raw material cost.

SUMMARY OF THE INVENTION

In order to overcome the technical defects such as complex preparation and high cost of the existing method of preparing fluoroelastomer capable of being vulcanized by using peroxide, the object of the present invention is to provide a method of preparing a fluoroelastomer capable of being vulcanized by using peroxide.

The method of preparing fluoroelastomer provided by the present invention comprises: in the presence of an initiator and a chain transfer agent, conducting emulsion polymerization reaction on comonomers to obtain a fluoroelastomer, wherein the chain transfer agent is alkyl iodide $RI_x$, wherein R is $C_{1-6}$ alkyl and x is a natural number ranged from 1-3.

Wherein, the fluoroelastomer contains 0.02-1.5 wt % iodine.

Wherein, the alkyl iodide is one or more of methyl iodide, ethyl iodide, 1,2-diiodoethane, iodoform and 1,3-diiodopropane.

Wherein, the comonomer comprises a first comonomer and a second comonomer; wherein the first comonomer is vinylidene fluoride (VDF), and the second comonomer is one or more of hexafluoropropylene (HFP), tetrafluoroethylene (TFE) and chlorotrifluor ethylene (CTFE).

Preferably, the fluoroelastomer is VDF/HFP, VDF/HFP/TFE, VDF/HFP/TFE/CTFE, VDF/HFP/CTFE copolymer.

As a preferable technical solution of the above-disclosed technical solution, the method of preparing fluoroelastomer comprises the following steps:

(1) adding an emulsifier, a pH regulator and water into a reactor, to obtain an emulsion with emulsifier mass-volume concentration of 0.5-1.0 g/L and pH regulator mass-volume concentration of 0.5-1.0 g/L;

(2) adding the mixed monomers of a first comonomer and a second comonomer into the reactor of step (1);

(3) under a pressure of 0.3-5.0 MPa and at a temperature of 50-120° C., adding an initiator into the reactor to initiate the polymerization reaction, and then adding alkyl iodide chain transfer agent thereto;

(4) adding residual mixed monomers in portions into the reactor of step (3), and maintaining the pressure constant in the reactor; and adding the initiator in portions until the polymerization reaction is finished;

(5) thereafter, condensing and washing the resulted polymer to obtain the fluoroelastomer, Wherein, the emulsifier of step (1) is a mixture composed of perfluoropolyether peroxide and octyl sulfonate at any ratio (a compound emulsifier, mainly used for replacing the popular perfluorooctoate and perfluorosulfonate emulsifiers for producing fluororubber on the present market); preferably at a weight ratio of 1:5 to 5:1.

Wherein, the pH regulator is selected from dipotassium hydrogen phosphate, disodium hydrogen phosphate, borax or sodium bicarbonate.

Wherein, in the mixed comonomers added in the step (2), the molar ratio of the first comonomer to the second comonomer is 30-60:70-40.

Wherein, the initiator of the step (3) is peroxide initiator, preferably one or more of ammonium persulfate, potassium persulfate and sodium persulfate.

Wherein, in the mixed monomer added in portions in the step (4), the molar ratio of the first comonomer to the second comonomer is 60-80:40-20.

The molecular structure of the product can be controlled by controlling the molar ratio of the supplemented first comonomer to second comonomer, so as to achieve the elastomer with desired mechanical performances.

Wherein, during the condensation of the step (5), one or more of potassium chloride, sodium chloride, ammonium chloride and ammonium carbonate is/are used as condensing agent.

In the method as described above, too low reaction pressure is unfavorable to the polymerization reaction, while too high pressure requires high requirements of the reaction container material, which is unfavorable to production.

Through comprehensive considerations, the reaction pressure is in the range of 0.3-5.0 MPa, preferably 1.2-3.0 MPa.

In the preparation methods above, when the reaction temperature is lower than 50° C., the activity of the initiator is reduced, which affects the conduction of the polymerization reaction; and when the reaction temperature is higher than 120° C., the decomposition rate of the initiator is too fast, which is unfavorable to the control of the reaction. The initiators added in the step (3) and the step (4) together achieve the mass-volume concentration of 0.10-0.3 g/L. The time frequency that the initiator is added in portions in the step (4) can be controlled to be once every 3-5 h, the added amount being the same each time.

The beneficial effects of the present invention are:

The preparation method provided by the present invention adopts alkyl iodide as the chain transfer agent, and introduces I atom, which can act as a crosslinking point during peroxide vulcanization, into the molecular structure of the polymer while reacting. The fluoroelastomer obtained by the preparation method of the present invention is greatly improved in the performance after being vulcanized. Moreover, due to the low cost and extensive sources of alkyl iodide, the preparation method provided by the present invention can also simplify the manufacturing process, reduce cost and has wide application prospects.

The polymerization process does not adopt vulcanization point monomers such as bromine or iodine containing alkene copolymers, but adopts compound emulsifiers (a mixture of perfluoropolyether peroxide and octyl sulfonate), and uses RIX (R is C1-6 alkyl, X=1-3) as the chain transfer agent and peroxide vulcanization point monomer simultaneously. Capping effect by I may be produced when main monomer fluorine containing VF2 copolymerizes with fluorine containing alkenes such as tetrafluoroethylene, tetrafluoroethylene, etc., and I atom is introduced into the molecular structure to act as a crosslinking point during peroxide vulcanization.

The present invention introduces "I" atom into the molecular structure as vulcanization point monomer by using RIX (R is C1-6 alkyl, X=1-3) as the chain transfer agent, and the obtained fluoroelastomer has a tensile strength up to 18 MPa and low permanent compression deformation after being vulcanized.

SPECIFIC MODE FOR CARRYING OUT THE EMBODIMENTS

The following Examples are described to illustrate the present invention, but not to limit the scope of the present invention. Unless otherwise specified, all reagents used in the Examples are conventional commercial reagents, and all technical means used in the Examples are conventional means well known by a skilled person in the art.

The method of testing the performance of the fluoroelastomer is given below:

Raw rubber Mooney ML (1+10) 121° C. test is performed according to ASTM D1646.

Wherein, the formula for vulcanization is:

| | |
|---|---|
| Raw rubber | 100 parts; |
| Zinc oxide | 3 parts; |
| N990 | 25 parts; |
| TAIC | 4 parts; |
| 2,5-dimethyl-2,5-bis(tertbutylperoxy)hexane | 2.5 parts; |
| First-stage vulcanization 168° C. × 10 min | |
| Second-stage vulcanization 232° C. × 4 h | |

The method of testing tensile strength is performed according to ASTM D412.

The method of testing permanent compression deformation is performed according to ASTM D1414.

Example 1

Deionized water 3 L, dipotassium hydrogen phosphate 2 g and emulsifier (a mixture of perfluoropolyether peroxide and sodium octyl sulfonate at 1:1) 2 g were added into a 5 L stainless steel reaction kettle with a stirrer. The mixed monomers of VDF/HFP at 60/40 (molar ratio) were added into the reaction kettle through a compresso after nitrogen pressurization and degassing via evacuation were repeatedly performed. The pressure of the kettle was elevated to 1.2 MPa at 80° C., and 10 g of 15 wt % ammonium persulfate aqueous solution were pumped thereinto via a metering pump, to initiate polymerization reaction. $ICH_2CH_2I$ 5 g was added and the mixed monomers of VDF/HFP at 80/20 (molar ratio) were supplemented simultaneously when the pressure of the reaction kettle decreased to 1.0 MPa (in order to allow thereaction monomer free radical to be formed in the reaction kettle), thereby maintaining the pressure inside the reaction kettle to be 1.2 MPa.

As the reaction proceeded, the initiator 10 g of 15 wt % ammonium persulfate aqueous solution was supplemented once every 4 h. The reaction lasted for about 10 h to obtain about 4.5 kg of elastomer emulsion. The emulsion was condensed with the aqueous solution of potassium chloride and washed, and dried for 14 h in an 80° C. vacuum drier to obtain the elastomer product.

ML(1+10) 121° C. Mooney value is 40, tensile strength is 16 MPa, permanent compression deformation (O-ring, 200° C., 70 h) is 24%.

Example 2

Deionized water 3 L, dipotassium hydrogen phosphate 2 g and emulsifier (a mixture of perfluoropolyether peroxide and sodium octyl sulfonate at 1:1) 2 g were added into a 5 L stainless steel reaction kettle with a stirrer. The mixed monomers of VDF/HFP at 60/40 (molar ratio) were added into the reaction kettle through a compressor, after nitrogen pressurization and degassing via evacuation were repeatedly performed. The pressure of the kettle was elevated to 1.2 MPa at 80° C., and 10 g of 15 wt % ammonium persulfate aqueous solution were pumped thereinto via a metering pump, to initiate polymerization reaction. $ICH_2CH_2I$ 8 g was added and the mixed monomers of VDF/HFP at 80/20 (molar ratio) were supplemented simultaneously when the pressure of the reaction kettle decreased to 1.0 MPa, thereby maintaining the pressure inside the reaction kettle to be 1.2 MPa.

As the reaction proceeded, the initiator 10 g of 15 wt % ammonium persulfate aqueous solution was supplemented once every 4 h. The reaction lasted for about 10 h to obtain about 4.5 kg of elastomer emulsion. The emulsion was condensed with the aqueous solution of potassium chloride and washed, and continuously dried for 14 h in an 80° C. vacuum drier to obtain the elastomer product.

ML(1+10) 121° C. Mooney value is 20, tensile strength is 17.2 MPa, permanent compression deformation (O-ring, 200° C., 70 h) is 20%.

Example 3

Deionized water 3 L, dipotassium hydrogen phosphate 2 g and emulsifier (a mixture of perfluoropolyether peroxide and sodium octyl sulfonate at 1:1) 2 g were added into a 5 L stainless steel reaction kettle with a stirrer. The mixed monomers of VDF/HFP/TFE at 30/40/30 (molar ratio) were added into the reaction kettle through a compressor after nitrogen pressurization and degassing via evacuation were repeatedly performed. The pressure of the kettle was elevated to 1.2 MPa at 80° C., and 10 g of 15 wt % ammonium persulfate aqueous solution were pumped thereinto via a metering pump, to initiate polymerization reaction. $ICH_2CH_2I$ 4 g was added and the mixed monomers of VDF/HFP/TFE at 60/17/23 (molar ratio) were supplemented simultaneously when the pressure of the reaction kettle decreased to 1.0 MPa, thereby maintaining the pressure inside the reaction kettle to be 1.2 MPa.

As the reaction proceeded, the initiator 10 g of 15 wt % ammonium persulfate aqueous solution was supplemented once every 4 h. The reaction lasted for about 8 h to obtain about 4.5 kg of elastomer emulsion. The emulsion was condensed with the aqueous solution of sodium chloride and washed, and continuously dried for 14 h in an 80° C. vacuum drier to obtain the elastomer product.

ML(1+10) 121° C. Mooney value is 30, tensile strength is 19.3 MPa, permanent compression deformation (O-ring, 200° C., 70 h) is 40%.

Example 4

Deionized water 3 L, dipotassium hydrogen phosphate 2 g and emulsifier (a mixture of perfluoropolyether peroxide and sodium octyl sulfonate at 1:1) 2 g were added into a 5 L stainless steel reaction kettle with a stirrer. The mixed monomers of VDF/HFP/CTFE at 30/40/30 (molar ratio) were added into the reaction kettle through a compressor after nitrogen pressurization and degassing via evacuation were repeatedly performed. The pressure of the kettle was elevated to 1.5 MPa at 80° C., and 10 g of 15 wt % ammonium persulfate aqueous solution was pumped into the kettle via a metering pump, to initiate polymerization reaction. $ICH_2CH_2I$ 4.2 g was added and the mixed monomers of VDF/HFP/CTFE at 60/17/23 (molar ratio) were supplemented simultaneously when the pressure of the reaction kettle decreased to 1.4 MPa, thereby maintaining the pressure inside the reaction kettle to be 1.5 MPa.

As the reaction proceeded, the initiator 10 g of 15 wt % ammonium persulfate aqueous solution was supplemented once every 4 h. The reaction lasted for about 8 h to obtain about 4.5 kg of elastomer emulsion. The emulsion was condensed with the aqueous solution of sodium chloride and washed, and continuously dried for 14 h in an 80° C. vacuum drier to obtain the elastomer product.

ML(1+10) 121° C. Mooney value is 60, tensile strength is 17.9 MPa, permanent compression deformation (O-ring, 200° C., 70 h) is 35%.

Example 5

Deionized water 3 L, dipotassium hydrogen phosphate 2 g and emulsifier (a mixture of perfluoropolyether peroxide and sodium octyl sulfonate at 1:1) 2 g were added into a 5 L stainless steel reaction kettle with a stirrer. The mixed monomers of VDF/HFP/CTFE at 30/40/30 (molar ratio) were added into the reaction kettle through a compressor, after nitrogen pressurization and degassing via evacuation were repeatedly performed. The pressure of the kettle was elevated to 2.5 MPa at 80° C., and 10 g of 15 wt % ammonium persulfate aqueous solution was added into the kettle via a metering pump, to initiate polymerization reaction. Iodoform 3.5 g was added and the mixed monomers of VDF/HFP/CTFE at 60/17/23 (molar ratio) were supplemented simultaneously when the pressure of the reaction kettle decreased to 2.4 MPa, thereby maintaining the pressure inside the reaction kettle to be 2.5 MPa.

As the reaction proceeded, the initiator 10 g of 15 wt % ammonium persulfate aqueous solution was supplemented once every 4 h. The reaction lasted for about 8 h to obtain about 4.5 kg of elastomer emulsion. The emulsion was condensed with the aqueous solution of sodium chloride and washed, and continuously dried for 14 h in an 80° C. vacuum drier to obtain the elastomer product.

ML(1+10) 121° C. Mooney value is 48, tensile strength is 17.8 MPa, permanent compression deformation (O-ring, 200° C., 70 h) is 38%.

Example 6

Deionized water 3 L, dipotassium hydrogen phosphate 2 g and emulsifier (a mixture of perfluoropolyether peroxide and sodium octyl sulfonate at 1:1) 2 g were added into a 5 L stainless steel reaction kettle with a stirrer. The mixed monomers of VDF/HFP/CTFE at 30/40/30 (molar ratio) were added into the reaction kettle through a compressor, after nitrogen pressurization and degassing via evacuation were repeatedly performed. The pressure of the kettle was elevated to 2.5 MPa at 70° C., and 10 g of 15 wt % ammonium persulfate initiator was pumped into the kettle via a metering pump, to initiate polymerization reaction. 1,4-diiodobutane 3.5 g was added and the mixed monomers of VDF/HFP/CTFE at 60/17/23 (molar ratio) were supplemented simultaneously when the pressure of the reaction kettle decreased to 2.4 MPa, thereby maintaining the pressure inside the reaction kettle to be 2.5 MPa.

As the reaction proceeded, the initiator 10 g of 15 wt % ammonium persulfate aqueous solution was supplemented once every 4 h. The reaction lasted for about 8 h to obtain about 4.5 kg of elastomer emulsion. The emulsion was condensed with the aqueous solution of sodium chloride and washed, and continuously dried for 14 h in an 80° C. vacuum drier to obtain the elastomer product.

ML(1+10) 121° C. Mooney value is 35, tensile strength is 17.5 MPa, permanent compression deformation (O-ring, 200° C., 70 h) is 36%.

Example 7

Deionized water 3 L, dipotassium hydrogen phosphate 2 g and emulsifier (a mixture of perfluoropolyether peroxide and sodium octyl sulfonate at 1:1) 2 g were added into a 5 L stainless steel reaction kettle with a stirrer. The mixed monomers of VDF/HFP/TFE/CTFE=30/40/25/5 (molar ratio) were added into the reaction kettle through a compressor, after nitrogen pressurization and degassing via evacuation were repeatedly performed. The pressure of the kettle was elevated to 2.5 MPa at 70° C., and 10 g of 15 wt % APS (ammonium persulfate) initiator was pumped into the kettle via a metering pump, to initiate polymerization reaction. 1,3-diiodopropane 3.5 g was added and the mixed monomers of VDF/HFP/TFE/CTFE at 60/17/20/3 (molar ratio) were supplemented simultaneously when the pressure of the reaction kettle decreased to 2.4 MPa, thereby maintaining the pressure inside the reaction kettle to be 2.5 MPa.

As the reaction proceeded, the initiator 10 g of 15 wt % ammonium persulfate aqueous solution was supplemented once every 4 h. The reaction lasted for about 8 h to obtain about 4.5 kg of elastomer emulsion. The emulsion was condensed with the aqueous solution of sodium chloride and washed, and continuously dried for 14 h in an 80° C. vacuum drier to obtain the elastomer product.

ML(1+10) 121° C. Mooney value is 35, tensile strength is 19.5 MPa, permanent compression deformation (O-ring, 200° C., 70 h) is 36%.

Example 8

Deionized water 3 L, dipotassium hydrogen phosphate 2 g and emulsifier (a mixture of perfluoropolyether peroxide and sodium octyl sulfonate at 1:1) 2 g were added into a 5 L stainless steel reaction kettle with a stirrer. The mixed monomers of VDF/HFP/TFE/CTFE at 30/40/25/5 (molar ratio) were added into the reaction kettle through a compressor, after nitrogen pressurization and degassing via evacuation were performed repeatedly. The pressure of the kettle was elevated to 3.0 MPa at 95° C., and 10 g of 15 wt % potassium persulfate aqueous solution initiator was pumped into the kettle via a metering pump, to initiate polymerization reaction. 1,3-diiodopropane 3.5 g was added and the mixed monomers of VDF/HFP/TFE/CTFE at 60/17/20/3 (molar ratio) were supplemented simultaneously when the pressure of the reaction kettle decreased to 2.8 MPa, thereby maintaining the pressure inside the reaction kettle to be 3.0 MPa.

As the reaction proceeded, the initiator 10 g of 15 wt % a potassium persulfate aqueous solution was supplemented once every 4 h. The reaction lasted for about 6 h to obtain about 4.5 kg of elastomer emulsion. The emulsion was condensed with the aqueous solution of sodium chloride and washed, and continuously dried for 14 h in an 80° C. vacuum drier to obtain the elastomer product.

ML(1+10) 121° C. Mooney value is 32, tensile strength is 20.2 MPa, permanent compression deformation (O-ring, 200° C., 70 h) is 44%.

Comparative Example 1

Deionized water 3 L, dipotassium hydrogen phosphate 2 g and emulsifier (a mixture of perfluoropolyether peroxide and sodium octyl sulfonate at 1:1) 2 g were added into a 5 L stainless steel reaction kettle with a stirrer. The mixed monomers of VDF/HFP/TFE at 35/40/25 (molar ratio) were added into the reaction kettle through a compressor, after nitrogen pressurization and degassing via evacuation were repeatedly performed. The pressure of the kettle was elevated to 2.5 MPa at 70° C., and 10 g of 15 wt % APS (ammonium persulfate) initiator was pumped into the kettle via a metering pump, to initiate polymerization reaction. Perfluorodiiodoethane 6 g and 4-iodo-3,3,4,4-tetrafluorobutene-1 10 g were added and the mixed monomers of VDF/HFP/TFE at 60/20/20 (molar ratio) were supplemented simultaneously when the pressure of the reaction kettle decreased to 2.4 MPa, thereby maintaining the pressure inside the reaction kettle to be 2.5 MPa.

As the reaction proceeded, the initiator 10 g of 15 wt % ammonium persulfate aqueous solution was supplemented once every 4 h. The reaction lasted for about 8 h to obtain about 4.5 kg of elastomer emulsion. The emulsion was condensed with the aqueous solution of sodium chloride and washed, and continuously dried for 14 h in an 80° C. vacuum drier to obtain the elastomer product.

ML(1+10) 121° C. Mooney value is 35, tensile strength is 17.2 MPa, permanent compression deformation (O-ring, 200° C., 70 h) is 37%.

Comparative Example 2

Deionized water 3 L, dipotassium hydrogen phosphate 2 g and emulsifier (ammonium perfluorooctanoate) 2 g were added into a 5 L stainless steel reaction kettle with a stirrer. The mixed monomers of VDF/HFP/TFE/CTFE at 30/40/25/5 (molar ratio) were added into the reaction kettle through a compressor, after nitrogen pressurization and degassing via evacuation were repeatedly performed. The pressure of the kettle was elevated to 2.5 MPa at 70° C., and 10 g of 15 wt % APS (ammonium persulfate) initiator was pumped thereinto via a metering pump, to initiate polymerization reaction. 1,3-diiodopropane 3.5 g was added and the mixed monomers of VDF/HFP/TFE/CTFE=60/17/20/3 (molar ratio) were supplemented simultaneously when the pressure of the reaction kettle decreased to 2.4 MPa, thereby maintaining the pressure inside the reaction kettle to be 2.5 MPa.

As the reaction proceeded, the initiator 10 g of 15 wt % ammonium persulfate aqueous solution was supplemented once every 4 h. The reaction lasted for about 8 h to obtain about 4.5 kg of elastomer emulsion. The emulsion was condensed with the aqueous solution of sodium chloride and washed, and continuously dried for 14 h in an 80° C. vacuum drier to obtain the elastomer product.

ML(1+10) 121° C. Mooney value is 35, tensile strength is 17.3 MPa, permanent compression deformation (O-ring, 200° C., 70 h) is 41%.

Although the present invention is described in detail using general description and specific embodiments hereinbefore, it is obvious to a person skilled in the art that some modifications or improvements can be made based on the present invention. Hence all these modifications or improvements made on the basis of not deviating from the spirit of the present invention fall into the protection scope claimed in the present invention.

INDUSTRIAL APPLICABILITY

The method of preparing a fluoroelastomer capable of being vulcanized by using peroxide provided by the present invention comprises: in the presence of an initiator and a chain transfer agent, conducting emulsion polymerization reaction on comonomers to obtain a fluoroelastomer, wherein the chain transfer agent is alkyl iodide $RI_x$. The preparation method provided by the present invention utilizes alkyl iodide $RI_x$ as the chain transfer agent, and introduces the atom I into the molecular structure of the polymer during the reaction, the atom I acting as a cross-linking point during peroxide vulcanization. The fluoroelastomer obtained via the preparation method of the present invention is greatly improved in the performance after being vulcanized. Moreover, due to the low cost and extensive sources of alkyl iodide, the preparation method provided by the present invention can also simplify the manufacturing process, reduce cost, and has wide application prospects and thus has industrial applicability.

What is claimed is:
1. A method of preparing fluoroelastomer capable of being vulcanized by using peroxide, comprising in the presence of an initiator and a chain transfer agent, conducting emulsion polymerization reaction in a starting emulsion on comonomers to obtain the fluoroelastomer, characterized in that, the chain transfer agent is alkyl iodide $RI_x$, wherein R is C1-6 alkyl, and x is a natural number ranged from 1-3, wherein the starting emulsion is formed with an emulsifier comprising a mixture of perfluoropolyether peroxide and octyl sulfonate at a weight ratio of from 1:5 to 5:1.

2. The method according to claim 1, characterized in that, the fluoroelastomer contains 0.02-1.5 wt % iodine.

3. The method according to claim 1, characterized in that, the alkyl iodide $RI_x$ is one or more of methyl iodide, ethyl iodide, 1,2-diiodoethane, iodoform and 1,3-diiodopropane.

4. The method according to claim 1, characterized in that, the comonomer comprises a first comonomer and a second comonomer; wherein, the first comonomer is vinylidene fluoride, and the second comonomer is one or more of hexafluoropropylene, tetrafluoroethylene and chlorotrifluoroethylene.

5. The method according to claim 1, characterized in that, the method of preparing the fluoroelastomer comprises the following steps:
   (1) adding the emulsifier, a pH regulator and water into a reactor, to obtain an emulsion with emulsifier mass-volume concentration of 0.5-1.0 g/L and pH regulator mass-volume concentration of 0.5-1.0 g/L;
   (2) adding the mixed monomers of the first comonomer and the second comonomer into the reactor of step (1), to allow the pressure of the reactor to reach 0.3-5.0 MPa;
   (3) under a pressure of 0.3-5.0 MPa and at a temperature of 50-120° C., adding an initiator into the reactor to initiate polymerization reaction, and then adding a chain transfer agent thereinto;
   (4) adding the mixed monomers in portions into the reactor of step (3), and maintaining the pressure constant in the reactor; and adding the initiator in portions until the polymerization reaction is finished;
   (5) after the reaction is finished, condensing and washing the resulted polymer to obtain the fluoroelastomer.

6. The method according to claim 5, characterized in that, the emulsifier of step (1) is a mixture composed of perfluoropolyether peroxide and octyl sulfonate; and the pH regulator is selected from dipotassium hydrogen phosphate, disodium hydrogen phosphate, borax or sodium bicarbonate.

7. The method according to claim 5, characterized in that, in the mixed comonomers added in the step (2), the molar ratio of the first comonomer to the second comonomer is 30-60:70-40.

8. The method according to claim 5, characterized in that, the initiator of the step (3) is peroxide initiator, which is selected from one or more of ammonium persulfate, potassium persulfate and sodium persulfate.

9. The method according to claim 5, characterized in that, in the mixed monomer added in portions in the step (4), the molar ratio of the first comonomer to the second comonomer is 60-80:40-20.

10. The method according to claim 5, characterized in that, during the condensation of the step (5), one or more of potassium chloride, sodium chloride, ammonium chloride and ammonium carbonate is/are used as a condensing agent.

11. The method according to claim 2, characterized in that, the alkyl iodide $RI_x$ is one or more of methyl iodide, ethyl iodide, 1,2-diiodoethane, iodoform and 1,3-diiodopropane.

12. The method according to claim 2, characterized in that, the comonomer comprises a first comonomer and a second comonomer; wherein, the first comonomer is vinylidene fluoride, and the second comonomer is one or more of hexafluoropropylene, tetrafluoroethylene and chlorotrifluoroethylene.

13. The method according to claim 2, characterized in that, the method of preparing the fluoroelastomer comprises the following steps:
   (1) adding the emulsifier, a pH regulator and water into a reactor, to obtain an emulsion with emulsifier mass-volume concentration of 0.5-1.0 g/L and pH regulator mass-volume concentration of 0.5-1.0 g/L;
   (2) adding the mixed monomers of the first comonomer and the second comonomer into the reactor of step (1), to allow the pressure of the reactor to reach 0.3-5.0 MPa;
   (3) under a pressure of 0.3-5.0 MPa and at a temperature of 50-120° C., adding an initiator into the reactor to initiate polymerization reaction, and then adding a chain transfer agent thereinto;
   (4) adding the mixed monomers in portions into the reactor of step (3), and maintaining the pressure constant in the reactor; and adding the initiator in portions until the polymerization reaction is finished;
   (5) after the reaction is finished, condensing and washing the resulted polymer to obtain the fluoroelastomer.

14. The method according to claim 3, characterized in that, the method of preparing the fluoroelastomer comprises the following steps:
   (1) adding the emulsifier, a pH regulator and water into a reactor, to obtain an emulsion with emulsifier mass-volume concentration of 0.5-1.0 g/L and pH regulator mass-volume concentration of 0.5-1.0 g/L;
   (2) adding the mixed monomers of the first comonomer and the second comonomer into the reactor of step (1), to allow the pressure of the reactor to reach 0.3-5.0 MPa;
   (3) under a pressure of 0.3-5.0 MPa and at a temperature of 50-120° C., adding an initiator into the reactor to initiate polymerization reaction, and then adding a chain transfer agent thereinto;
   (4) adding the mixed monomers in portions into the reactor of step (3), and maintaining the pressure constant in the reactor; and adding the initiator in portions until the polymerization reaction is finished;
   (5) after the reaction is finished, condensing and washing the resulted polymer to obtain the fluoroelastomer.

15. The method according to claim 4, characterized in that, the method of preparing the fluoroelastomer comprises the following steps:
   (1) adding the emulsifier, a pH regulator and water into a reactor, to obtain an emulsion with emulsifier mass-volume concentration of 0.5-1.0 g/L and pH regulator mass-volume concentration of 0.5-1.0 g/L;
   (2) adding the mixed monomers of the first comonomer and the second comonomer into the reactor of step (1), to allow the pressure of the reactor to reach 0.3-5.0 MPa;
   (3) under a pressure of 0.3-5.0 MPa and at a temperature of 50-120° C., adding an initiator into the reactor to initiate polymerization reaction, and then adding a chain transfer agent thereinto;
   (4) adding the mixed monomers in portions into the reactor of step (3), and maintaining the pressure constant in the reactor; and adding the initiator in portions until the polymerization reaction is finished;
   (5) after the reaction is finished, condensing and washing the resulted polymer to obtain the fluoroelastomer.

16. The method according to claim 11, characterized in that, the method of preparing the fluoroelastomer comprises the following steps:

(1) adding the emulsifier, a pH regulator and water into a reactor, to obtain an emulsion with emulsifier mass-volume concentration of 0.5-1.0 g/L and pH regulator mass-volume concentration of 0.5-1.0 g/L;
(2) adding the mixed monomers of the first comonomer and the second comonomer into the reactor of step (1), to allow the pressure of the reactor to reach 0.3-5.0 MPa;
(3) under a pressure of 0.3-5.0 MPa and at a temperature of 50-120° C., adding an initiator into the reactor to initiate polymerization reaction, and then adding a chain transfer agent thereinto;
(4) adding the mixed monomers in portions into the reactor of step (3), and maintaining the pressure constant in the reactor; and adding the initiator in portions until the polymerization reaction is finished;
(5) after the reaction is finished, condensing and washing the resulted polymer to obtain the fluoroelastomer.

17. The method according to claim 12, characterized in that, the method of preparing the fluoroelastomer comprises the following steps:
(1) adding the emulsifier, a pH regulator and water into a reactor, to obtain an emulsion with emulsifier mass-volume concentration of 0.5-1.0 g/L and pH regulator mass-volume concentration of 0.5-1.0 g/L;
(2) adding the mixed monomers of the first comonomer and the second comonomer into the reactor of step (1), to allow the pressure of the reactor to reach 0.3-5.0 MPa;
(3) under a pressure of 0.3-5.0 MPa and at a temperature of 50-120° C., adding an initiator into the reactor to initiate polymerization reaction, and then adding a chain transfer agent thereinto;
(4) adding the mixed monomers in portions into the reactor of step (3), and maintaining the pressure constant in the reactor; and adding the initiator in portions until the polymerization reaction is finished;
(5) after the reaction is finished, condensing and washing the resulted polymer to obtain the fluoroelastomer.

18. The method according to claim 6, wherein the emulsifier of step (1) is a mixture composed of perfluoropolyether peroxide and octyl sulfonate at a weight ratio of 1:5 to 5:1.

19. The method according to claim 1, wherein the emulsion polymerization reaction of comonomers to obtain the fluoroelastomer is performed in the absence of bromine containing alkenes or iodine containing alkenes.

20. The method according to claim 6, wherein the octyl sulfonate is sodium octyl sulfonate.

* * * * *